Patented Apr. 24, 1934

1,955,978

UNITED STATES PATENT OFFICE 1,955,978

METHOD OF ORE SEPARATION

Joseph P. Ruth, Jr., Denver, Colo., assignor to The Ruth Company, Denver, Colo., a corporation of Colorado No Drawing. Application August 23, 1932, Serial No. 630,093

5 Claims. (Cl. 209—167)

This invention relates to improvements in methods for differential flotation ore separation and has reference more particularly to an improved method of inhibiting pyrrhotite and pyrite when these two sulfides of iron are present in complex sulfide ores in which the separation of valuable sulfides is to be accomplished.

I have found that if an ore contains pyrrhotite and iron pyrite together with lead and zinc sulfides, the iron pyrite cannot be inhibited by the same methods as are ordinarily used to inhibit pyrrhotite. I have found that by aerating for a certain period of time, usually about twenty minutes, the pyrrhotite will oxidize or the surface of the pyrrhotite is affected in such a manner as to prevent its flotation or attachment to bubbles during the flotation operation. This method of inhibiting, however, is quite ineffective in inhibiting pyrite which is not so easily oxidized.

As an example of this process in the separation of a complex ore containing pyrite, pyrrhotite, zinc sulfide and lead sulfide, the first step, of course, would be to grind these sulfides to the point where complete liberation is effected. The next step consists of aerating to inhibit the pyrrhotite present in the ore; the next step is to filter to remove the soluble and detrimental constituents produced by the aeration, and which, of course, may be present inherently in the ore. This step, however, of filtering may be eliminated where the salts present are not detrimental. However, if the filtration step is eliminated it becomes necessary to subject the pulp to a deaerating operation which will remove the soluble air and oxygen prior to the addition of the cyanide compounds which are used to inhibit the pyrite and zinc sulfide. However, I prefer to filter this ore after being ground to liberation which removes not only the soluble deleterious salts but removes the water as well which contains soluble air. This filtered ore is then introduced into a conditioner of the Devereaux type which is totally enclosed and so constructed as to prevent air being beaten into the mass. This conditioner is for the sole purpose of mixing, commingling and maintaining in suspension the sulfides in the absence of air, with water that has previously been deaerated and the chemical compound, zinc, cyanide. This conditioner is of such a size as to allow a period of contact time of approximately thirty minutes. When the pulp overflows the conditioner, it requires further conditioning and aeration of approximately five or ten minutes, which drives out the cyanide or cyanide compounds of some nature or other, so that, by the addition of cresylic acid and a promoter such as a di-substituted dithiophosphate, a lead concentrate, practically pure in lead is obtained.

Since the primary aeration effectively inhibited the pyrrhotite, the cyanide in deaerated water in the absence of air inhibited the pyrite, and the zinc sulfide, but neither of these two conditions had any inhibiting effect on the lead sulfide, with the result that it floated profusely and cleanly. After the removal of the lead concentrate by this flotation step, the zinc concentrate is revivified or promoted by the addition of copper sulfate and a promoter such as sodium aeropersulfate and additional cresylic acid and the zinc float, and additional cresylic acid and the zinc floats readily and completely.

What I claim is:

1. A flotation process for the separation of ores containing valuable sulfides mixed with pyrrhotite and iron pyrite which comprises subjecting the pulp to aeration to inhibit the pyrrhotite, conditioning the pulp in the absence of air with zinc cyanide whereby the iron pyrite is inhibited together with one or more of the valuable sulfides, revivifying the inhibited valuable sulfides in succession and removing them as they are revivified.

2. A flotation process for the separation of ores containing a valuable sulfide mixed with pyrrhotite and iron pyrite which comprises subjecting the pulp to aeration whereby the pyrrhotite is inhibited, conditioning the pulp with zinc cyanide in the absence of air whereby the iron pyrite is inhibited, revivifying the valuable sulfide, adding a promoter, and subjecting to froth flotation separation whereby the valuable sulfide is removed.

3. In the flotation process for the separation of zinc sulfide from ores containing pyrrhotite, pyrite and zinc sulfide, the steps of aerating the pulp to inhibit the pyrrhotite, subjecting the pulp to a deaerating operation, adding zinc cyanide whereby the pyrite will be inhibited, adding copper sulfate to revivify the zinc sulfide adding a promoter and subjecting to froth flotation whereby the zinc sulfide is separated.

4. In the flotation process for the separation of lead sulfide from ores containing pyrrhotite, pyrite, zinc sulfide and lead sulfide, the steps of aerating the pulp to inhibit the pyrrhotite, filtering to remove the soluble and detrimental constituents produced by the aeration, repulping, with deaerated water, conditioning with zinc cyanide in the absence of air, conditioning further and aerating, adding cresylic acid and a promoter, and subjecting to froth flotation separation whereby the lead sulfide is removed.

5. The method of separating lead and zinc sulfides from ores in which they are present with pyrrhotite and iron pyrite which comprises grinding the ore to liberation, subjecting the pulp to aeration whereby the pyrrhotite is inhibited, filtering to remove any detrimental soluble salts, repulping with deaerated water, conditioning with zinc cyanide in the absence of air whereby the iron pyrite and the zinc sulfide will be inhibited, removing the cyanide compound by aeration, adding cresylic acid and a promoter, subjecting to froth flotation separation whereby the lead is removed, adding copper sulfate to revivify the zinc sulfide, adding a promoter, and subjecting to froth flotation separation whereby the zinc is removed.

JOSEPH P. RUTH, Jr.